(12) United States Patent
Read et al.

(10) Patent No.: US 12,522,321 B2
(45) Date of Patent: Jan. 13, 2026

(54) SACRIFICIAL YARN FILAMENT FOR USE IN CERAMIC MATRIX COMPOSITES, METHODS OF MANUFACTURE THEREOF AND ARTICLES COMPRISING THE SAME

(71) Applicant: RTX Corporation, Farmington, CT (US)

(72) Inventors: Kathryn S. Read, Marlborough, CT (US); Zachary P. Konopaske, West Hartford, CT (US); Steven R. Clarke, Mansfield, MA (US); Aaron Tomich, Sutton, MA (US)

(73) Assignee: RTX CORPORATION, Farmington, CT (US)

( * ) Notice: Subject to any disclaimer, the term of this patent is extended or adjusted under 35 U.S.C. 154(b) by 10 days.

(21) Appl. No.: 18/083,985

(22) Filed: Dec. 19, 2022

(65) Prior Publication Data

US 2024/0199499 A1 Jun. 20, 2024

Related U.S. Application Data

(60) Provisional application No. 63/291,867, filed on Dec. 20, 2021.

(51) Int. Cl.
*B63B 7/08* (2020.01)
*C04B 35/628* (2006.01)
(Continued)

(52) U.S. Cl.
CPC ........ *B63B 7/082* (2013.01); *C04B 35/62863* (2013.01); *C04B 35/80* (2013.01);
(Continued)

(58) Field of Classification Search
CPC ... C04B 35/80; C04B 35/62863; C04B 38/04; C04B 38/061; C04B 38/067;
(Continued)

(56) References Cited

U.S. PATENT DOCUMENTS

| | | |
|---|---|---|
| 5,354,398 A | 10/1994 | Kawai |
| 5,487,941 A | 1/1996 | Pepin |

(Continued)

FOREIGN PATENT DOCUMENTS

| | | |
|---|---|---|
| CA | 1175332 A | 10/1984 |
| WO | 2018139028 A1 | 8/2018 |

(Continued)

OTHER PUBLICATIONS

International Search Report for International Application Serial No. PCT/US2022/033998; International Filing Date Jun. 17, 2022; Report Mail Date Dec. 5, 2022 (7 pages).

(Continued)

*Primary Examiner* — Christina A Johnson
*Assistant Examiner* — Xue H Liu
(74) *Attorney, Agent, or Firm* — CANTOR COLBURN LLP

(57) ABSTRACT

Disclosed herein is a composite tow comprising a plurality of ceramic filaments; one or more sacrificial yarn filaments; where the sacrificial yarn filaments are operative to undergo decomposition or melting upon being subjected to an elevated temperature; and wherein the sacrificial yarn filaments leave open spaces in the tow upon being subjected to decomposition, dissolution or melting; where the filaments have an average filament diameter of 5 to 15 micrometers.

17 Claims, 2 Drawing Sheets

(51) Int. Cl.
*C04B 35/80* (2006.01)
*C04B 38/04* (2006.01)
*C04B 38/06* (2006.01)

(52) U.S. Cl.
CPC ............ *C04B 38/04* (2013.01); *C04B 38/061* (2013.01); *C04B 38/067* (2013.01); *B63B 2231/42* (2013.01); *C04B 2235/3826* (2013.01); *C04B 2235/5244* (2013.01); *C04B 2235/5256* (2013.01)

(58) Field of Classification Search
CPC .... C04B 2235/3826; C04B 2235/5244; C04B 2235/5256
USPC .......................................................... 264/44
See application file for complete search history.

(56) References Cited

U.S. PATENT DOCUMENTS

| | | | |
|---|---|---|---|
| 5,916,510 | A | 6/1999 | Jessen |
| 5,939,216 | A | 8/1999 | Kameda et al. |
| 5,961,661 | A | 10/1999 | Jessen |
| 6,418,973 | B1 | 7/2002 | Cox et al. |
| 6,641,893 | B1 | 11/2003 | Suresh et al. |
| 7,073,538 | B2 | 7/2006 | Bhatnagar et al. |
| 7,223,465 | B2 | 5/2007 | Subramanian et al. |
| 7,754,126 | B2 | 7/2010 | Subramanian et al. |
| 8,545,938 | B2 | 10/2013 | Schmidt et al. |
| 9,550,340 | B2 | 1/2017 | Olivier |
| 9,908,305 | B2 | 3/2018 | Chamberlain et al. |
| 10,011,535 | B2 | 7/2018 | La Forest et al. |
| 10,279,553 | B2 | 5/2019 | Hyson |
| 10,384,981 | B2 | 8/2019 | Hall et al. |
| 10,480,108 | B2 | 11/2019 | Shi |
| 10,604,872 | B1 | 3/2020 | Stackpoole et al. |
| 10,618,848 | B2 | 4/2020 | Luthra et al. |
| 10,822,280 | B2 | 11/2020 | Harris et al. |
| 10,913,687 | B2 | 2/2021 | Dambrine |
| 10,995,039 | B1 | 5/2021 | Dunn et al. |
| 10,995,040 | B2 | 5/2021 | Lamusga et al. |
| 11,021,779 | B2 | 6/2021 | Barrett et al. |
| 11,097,983 | B2 | 8/2021 | Hall et al. |
| 2003/0232946 | A1 | 12/2003 | Pope et al. |
| 2007/0007678 | A1 | 1/2007 | Benitsch |
| 2010/0119777 | A1 | 5/2010 | Merrill et al. |
| 2015/0240072 | A1 | 8/2015 | Esser-Kahn et al. |
| 2016/0348511 | A1 | 12/2016 | Varney |
| 2017/0015595 | A1 | 1/2017 | Weaver et al. |
| 2017/0306769 | A1 | 10/2017 | Lazur |
| 2018/0002238 | A1 | 1/2018 | Hockemeyer et al. |
| 2018/0044249 | A1 | 2/2018 | Taillet et al. |
| 2018/0179906 | A1 | 6/2018 | Schetzel et al. |
| 2018/0312950 | A1 | 11/2018 | Barrett et al. |
| 2019/0048730 | A1 | 2/2019 | Subramanian et al. |
| 2019/0100845 | A1 | 4/2019 | Ohashi et al. |
| 2019/0177240 | A1 | 6/2019 | Harris |
| 2019/0345073 | A1 | 11/2019 | Hall et al. |
| 2019/0359531 | A1 | 11/2019 | Steffier et al. |
| 2020/0181029 | A1 | 6/2020 | Clerambourg et al. |
| 2020/0308066 | A1 | 10/2020 | Shiang et al. |
| 2020/0346983 | A1 | 11/2020 | Read et al. |
| 2021/0024427 | A1 | 1/2021 | Liliedahl et al. |
| 2021/0262353 | A1 | 8/2021 | Mccaffrey et al. |
| 2023/0019485 | A1 | 1/2023 | Sudre et al. |
| 2023/0191656 | A1 | 6/2023 | Read et al. |
| 2023/0192562 | A1 | 6/2023 | Read et al. |
| 2024/0067578 | A1 | 2/2024 | Konopaske et al. |
| 2024/0278529 | A1 | 8/2024 | Read et al. |
| 2024/0278543 | A1 | 8/2024 | Roach et al. |

FOREIGN PATENT DOCUMENTS

| | | |
|---|---|---|
| WO | 2020209848 A1 | 10/2020 |
| WO | 2022266446 A1 | 12/2022 |

OTHER PUBLICATIONS

International Search Report for International Application Serial No. PCT/US2022/034000; International Filing Date Jun. 17, 2022; Report Mail Date Oct. 11, 2022 (5 pages).

Written Opinion for International Application Serial No. PCT/US2022/033998; International Filing Date Jun. 17, 2022; Report Mail Date Dec. 5, 2022 (12 pages).

Written Opinion for International Application Serial No. PCT/US2022/034000; International Filing Date Jun. 17, 2022; Report Mail Date Oct. 11, 2022 (10 pages).

International Search Report and Written Opinion issued in International Application No. PCT/US2022/053351; International Filing Date Dec. 19, 2022; Date of Mailing Mar. 17, 2023 (9 pages).

International Search Report and Written Opinion issued in International Application No. PCT/US2022/053354; International Filing Date Dec. 19, 2022; Date of Mailing Mar. 29, 2023 (12 pages).

International Search Report and Written Opinion issued in International Application No. PCT/US2022/053356; International Filing Date Dec. 19, 2022; Date of Mailing Mar. 22, 2023 (10 pages).

Search Report issued in European Patent Application No. 22912344.3; Date of Mailing Dec. 1, 2025 (8 pages).

Search Report issued in European Patent Application No. 22912342.7; Date of Mailing Nov. 14, 2025 (9 pages).

Search Report issued in European Patent Application No. 22912343.5; Date of Mailing Nov. 24, 2025 (8 pages).

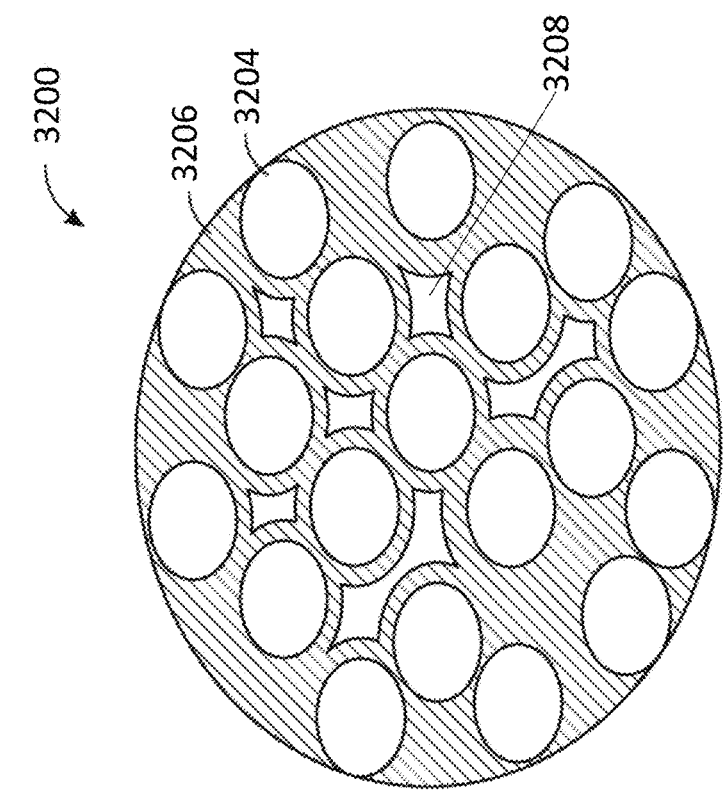
FIG. 2
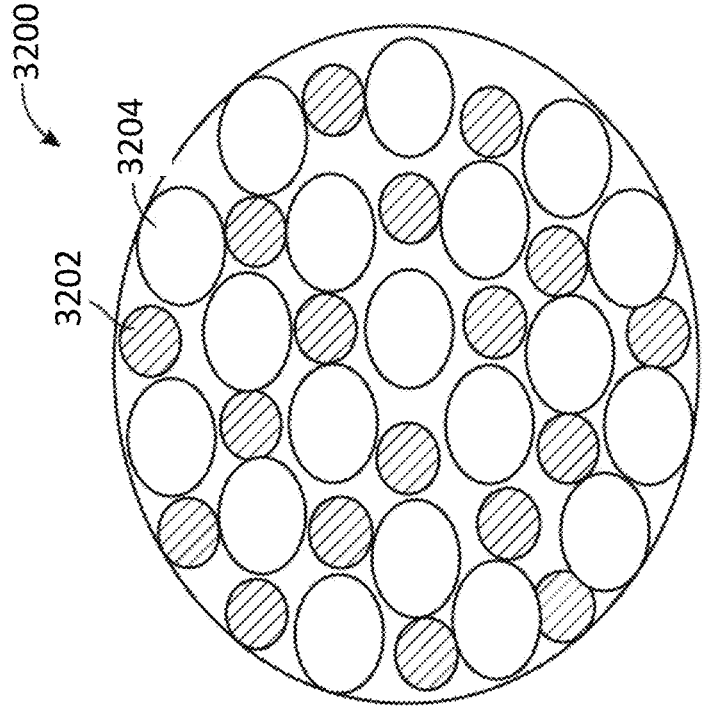

SACRIFICIAL YARN FILAMENT FOR USE IN CERAMIC MATRIX COMPOSITES, METHODS OF MANUFACTURE THEREOF AND ARTICLES COMPRISING THE SAME

CROSS-REFERENCE TO RELATED APPLICATIONS

This application claims the benefit of U.S. Provisional Application Ser. No. 63/291,867 filed Dec. 20, 2021, which is incorporated herein by reference in its entirety.

BACKGROUND

This disclosure relates to sacrificial yarns for use in ceramic matrix composites, methods of manufacture thereof and articles comprising the same. In particular, this disclosure relates to creating space in a tow to facilitate ceramic matrix precursor infiltration.

Preforms are used for the fabrication of ceramic matrix composite (CMC) structures using chemical vapor infiltration (CVI), polymer infiltration pyrolysis (PIP) and melt infiltration (MI). A preform can include fibers, which can be unidirectional or woven (e.g. plain weave, 5 Harness Satin Weave, 8 Harness Satin Weave, twill). In one form the fibers can be ceramic based and can be formed of silicon carbide (SiC).

The chemical vapor infiltration (CVI) process is commonly used to dispose matrix material into fibrous preforms by the use of reactive gases at elevated temperature to form fiber-reinforced composites. CVI can be applied to the production of ceramic matrix composites. Polymer infiltration pyrolysis (PIP) comprises the infiltration of a low viscosity polymer into the fiber structure, followed by pyrolysis. Under pyrolysis, the polymer precursor is heated in an inert atmosphere and transformed into a ceramic due to its decomposition. Melt infiltration is based on the infiltration of porous matrices with the melt of an active phase or precursor.

One of the key limitations of a CMC structure is that the structure can contain significant porosity (e.g., up to 15% and more) which is typically greatest in the center of the CMC structure and which can increase with an increasing thickness of the preform. The porosity can increase with thickness and can significantly impact both the in-plane and inter-laminar properties and overall oxidation resistance of the composite. It is therefore desirable to the develop methods and systems where the precursors can enter into the tows and therefore into the preform to produce a uniform distribution of the matrix.

SUMMARY

Disclosed herein is a composite tow comprising a plurality of ceramic filaments; one or more sacrificial yarn filaments: where the sacrificial yarn filaments are operative to undergo decomposition, dissolution or melting upon being subjected to an elevated temperature: and wherein the sacrificial yarn filaments leave open spaces in the tow upon being subjected to decomposition, dissolution or melting; where the filaments have an average filament diameter of 5 to 15 micrometers.

In an embodiment, the composite tow has an average diameter of 300 to 1500 micrometers.

In another embodiment, the ceramic filaments comprise SiC, Al2O3, BN, B4C, Si3N4, MoSi2, SiO2, SiOC, SiNC, and/or SiONC.

In yet another embodiment, the sacrificial yarn filaments comprise metal fibers, ceramic fibers, polymeric fibers or a combination thereof.

In yet another embodiment, the metal fibers and ceramic fibers melt at temperatures of less than 500° C.

In yet another embodiment, the polymeric fibers comprise thermoplastic polymers, blend of thermoplastic polymers, thermosetting polymers, or blends of thermoplastic polymers with thermosetting polymers.

In yet another embodiment, the sacrificial yarn filament is present in the composite tow in an amount of greater than or equal to 15 volume percent, based on a total volume of the composite tow.

In yet another embodiment, the sacrificial yarn filament is present in the composite tow in an amount of greater than or equal to 30 volume percent, based on a total volume of the composite tow.

In yet another embodiment, the sacrificial yarn filament comprises a water-soluble polymer, an ethanol soluble polymer, or a combination thereof.

In yet another embodiment, the water-soluble polymer comprises polyvinyl alcohol, polyacrylamide, polyvinyl butyral, or a combination thereof.

In yet another embodiment, an article comprising the composite tow.

Disclosed herein is a method comprising co-mingling a plurality of ceramic filaments with a or more sacrificial yarn filaments to form a composite tow: where the ceramic filaments have an average filament diameter of 5 to 10 micrometers.

In an embodiment, the composite tow has an average diameter of 300 to 1500 micrometers.

In yet another embodiment, the composite tow is subjected to an elevated temperature effective to decompose the sacrificial yarn to produce open spaces between the ceramic tows.

In yet another embodiment, open spaces in the composite tow are infiltrated with a ceramic precursor.

In yet another embodiment, the ceramic precursor is infiltrated to form a ceramic matrix.

In yet another embodiment, the ceramic matrix is SiC.

In yet another embodiment, the ceramic fiber is SiC.

In yet another embodiment, the sacrificial yarn filament is present in the composite tow in an amount of greater than or equal to 15 volume percent, based on a total volume of the composite tow.

In yet another embodiment, the sacrificial yarn filament is present in the composite tow in an amount of greater than or equal to 30 volume percent, based on a total volume of the composite tow.

BRIEF DESCRIPTION OF THE DRAWINGS

The following descriptions should not be considered limiting in any way. With reference to the accompanying drawings, like elements are numbered alike:

FIG. 2 is a depiction of a composite tow with both the sacrificial yarn filaments and the ceramic filaments.

DETAILED DESCRIPTION

Figure 1:
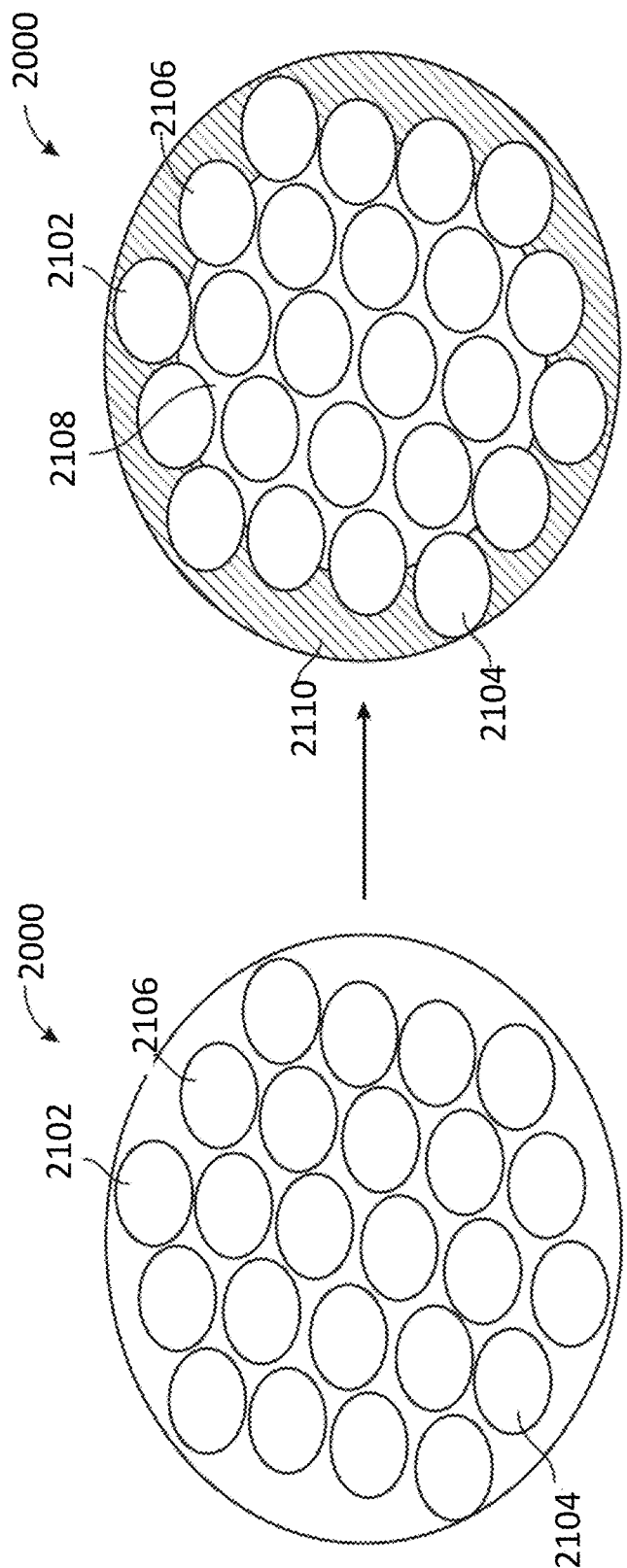
FIG. 1 is a depiction of the ceramic tow prior to and after infiltration.

A detailed description of one or more embodiments of the disclosed apparatus and method are presented herein by way of exemplification and not limitation with reference to the Figures.

Disclosed herein is a ceramic composite matrix that comprises composite tows that contain co-mingled ceramic filaments and sacrificial yarn filaments. These composite tows are woven, braided or otherwise arranged to form a composite preform. A matrix is then disposed around the remaining ceramic filaments. Some methods that may be used to dispose the matrix in such preforms include chemical vapor infiltration (CVI), slurry infiltration, polymer infiltration and pyrolysis (PIP) and melt infiltration. In all of these embodiments, the sacrificial yarn filaments from the composite tow are removed (via melting, dissolution or decomposition) permitting the matrix and/or matrix precursors to more easily enter the tow (because the spacing between the ceramic filaments is increased) and distribute uniformly in the spaces between ceramic filaments. This reduces the formation of voids in the tow and therefore facilitates the formation of a ceramic matrix composite with more uniform properties.

FIG. 1 depicts an exemplary embodiment of a prior art ceramic tow 2000 (on the left-hand side of the arrow) that comprises only ceramic filaments 2102, 2104, 2106, and so on. The filaments (both the ceramic as shown and the sacrificial that are added as depicted in the FIG. 2) may be continuous or dis-continuous in nature. A ceramic tow typically comprises hundreds of filaments but can be up to several thousand filaments. In an embodiment, the ceramic tow typically comprises 300 to several thousand filaments, preferably 400 to 600 filaments. The ceramic tows 2000 have an average cross-sectional diameter of 300 to 1500 micrometers, while the filaments 2102, 2104, 2106, and so on, have an average cross-sectional diameter of 5 to 30 micrometers. The cross-sectional area of a tow may be circular or flat.

When such a ceramic tow 2000 is subjected to precursor infiltration as may be seen on the right-hand side of the arrow, the precursor molecules react on the outer tows leaving voids 2108 in the interior of the tow 2000. There is limited matrix material in the interstices between the ceramic filaments 2102, 2104, 2106, and so on. This non-uniform distribution of matrix within the tow produces non-uniform properties and results in defects that reduce the life span of the resulting ceramic matrix composite.

Incorporating sacrificial yarn filaments into the tow prior to precursor infiltration can enable better distribution of the matrix in the tow after the sacrificial yarn is removed. The sacrificial yarn filaments will be made up of a material that thermally decomposes, melts or dissolves. Thermal decomposition and melting occur under the influence of heat (i.e., raising the temperature of the tow about the decomposition or melting point), while dissolution generally occurs in the presence of a suitable solvent.

A composite tow comprises a ceramic filament comingled with sacrificial yarns. FIG. 2 depicts an exemplary embodiment of a cross-section of a composite tow 3000 that comprises ceramic filaments 3004 comingled with sacrificial yarn filaments 3002. Sacrificial yarns may be made up of metal fibers, ceramic fibers, polymeric fibers, or a combination thereof.

The sacrificial yarn filaments 3002 are combined with the ceramic filaments 3004, to create the composite tow 3000 comprising co-mingled sacrificial yarn filaments and ceramic filaments. Sacrificial yarn filaments may be positioned to enable better infiltration into the inner areas of the composite tow. Twisting techniques may be used to better co-mingle the sacrificial yarn filaments and ceramic filaments. The width of the sacrificial yarn filaments and the quantity present in the tow may also vary. The specific locations and amount of the sacrificial yarn filaments may be adjusted to best support the desired ply structure as well as the efficient filling of the composite tows with the matrix material. The composite tows 3000 (containing the co-mingled ceramic filaments 3004 and the sacrificial yarn filaments 3002) are then woven or braided or otherwise formed into desired fibrous structure(s) (also called preforms) and subjected to the precursor infiltration process.

During the precursor infiltration process (such as for example, chemical vapor infiltration (CVI), polymer infiltration pyrolysis (PIP) and melt infiltration (MI)), the tow is subject to a high temperature causing the yarn filaments to decompose, dissolve or melt. This elevated temperature exposure occurs prior to infiltration of the precursors that produce the matrix material. After the decomposition, dissolution or melting of the sacrificial yarn filament occurs, a vacant space is left behind where the yarn filament previously was. The ceramic filaments now have larger spaces between them because of the removal of the sacrificial filaments. This space is therefore more easily infiltrated by the precursors used to form the ceramic matrix material. The embodiment of FIG. 2 on the right hand side depicts a composite tow 3000 where the sacrificial yarn filament 3202 has decomposed, dissolved or melted, leaving more room for the ceramic matrix material 3206 to infiltrate the center of the composite tow 3200. From the FIG. 2, it may be seen that the tow is further infiltrated with the ceramic matrix material 3206 (shown as the shaded area). The void space 3208 in the FIG. 1 is much reduced when compared with the void space 2018 seen in the FIG. 2.

This reduces the volume of regions in the center of the tow that have a lower concentration of the ceramic material when compared with regions near the outer surface of the tow (that have a higher concentration of ceramic material). This leads to a more uniform distribution of matrix in the tow and reduces the formation of heterogenous zones that contain voids in the central region of the tow.

The sacrificial yarn filament can include metal fibers, ceramic fibers or polymeric fibers. The metal fibers and ceramic fibers are typically low melting fibers that melt at temperatures of 500° C. or less. They are mixed with the desired ceramic filaments to form the composite tow. The metal or ceramic fibers generally melt and drip away from the fiber leaving behind only the desired ceramic filaments with spaces in between the filaments. The ceramic vapor precursors diffuse into the additional spaces between the filaments to form the matrix.

Metal fibers that have low melting points are listed in the Table below. Alloys of two or more of bismuth, indium, tin, thallium, cadmium and lead may be used.

| Metal or Alloy name | Melting point (° C.) |
| --- | --- |
| Bismuth | 271 |
| Indium | 157 |
| Tin | 232 |
| Thallium | 304 |
| Cadmium | 321 |
| Lead | 327 |
| Cerrobend | 70 |
| Cerrolow 117 | 47 |
| Cerrolow 174 | 79 |
| Field's | 62 |
| Harper's | 75 |
| Lichtenberg's | 92 |
| Lipowitz | 80 |
| Newton's | 98 |

Polymeric fibers undergo decomposition at temperatures of over 300° C. It is desirable for the polymeric fibers to be low charring fibers, i.e., they produce little to no char upon undergoing decomposition. The polymeric fibers can also be removed by dissolution in a solvent. Suitable solvents are water, ethanol, or a combination thereof.

Organic polymers used in the sacrificial yarns can be from a wide variety of thermoplastic polymers, blend of thermoplastic polymers, thermosetting polymers, or blends of thermoplastic polymers with thermosetting polymers. The organic polymer may also be a blend of polymers, copolymers, terpolymers, or combinations comprising at least one of the foregoing organic polymers. The organic polymer can also be an oligomer, a homopolymer, a copolymer, a block copolymer, an alternating block copolymer, a random polymer, a random copolymer, a random block copolymer, a graft copolymer, a star block copolymer, a dendrimer, a polyelectrolyte (polymers that have some repeat groups that contain electrolytes), a polyampholyte (a polyelectrolyte having both cationic and anionic repeat groups), an ionomer, or the like, or a combination thereof. The organic polymers have number average molecular weights greater than 10,000 grams per mole, preferably greater than 20,000 g/mole and more preferably greater than 50,000 g/mole.

Examples of thermoplastic polymers that can be used in the sacrificial yarns include polyacetals, polyacrylics, polycarbonates, polyalkyds, polystyrenes, polyolefins, polyesters, polyamides, polyaramides, polyamideimides, polyarylates, polyurethanes, epoxies, phenolics, silicones, polyarylsulfones, polyethersulfones, polyphenylene sulfides, polysulfones, polyimides, polyetherimides, polytetrafluoroethylenes, polyetherketones, polyether ether ketones, polyether ketone ketones, polybenzoxazoles, polyoxadiazoles, polybenzothiazinophenothiazines, polybenzothiazoles, polypyrazinoquinoxalines, polypyromellitimides, polyguinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinylhalides, polyvinyl nitriles, polyvinyl esters, polysulfonates, polysulfides, polythioesters, polysulfones, polysulfonamides, polyureas, polyphosphazenes, polysilazanes, polypropylenes, polyethylenes, polyethylene terephthalates, polyvinylidene fluorides, polysiloxanes, or the like, or a combination thereof.

Examples of polyelectrolytes are polystyrene sulfonic acid, polyacrylic acid, pectin, carrageenan, alginates, carboxymethylcellulose, poly vinylpyrrolidone, or the like, or a combination thereof.

Examples of thermosetting polymers suitable for use in the polymeric yarns include epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, diallyl phthalate, triallyl cyanurate, triallyl isocyanurate, unsaturated polyesterimides, or the like, or a combination thereof.

Examples of blends of thermoplastic polymers include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleicanhydride/acrylonitrile-butadiene-styrene, polyether etherketone/polyethersulfone, polyether etherketone/polyetherimide polyethylene/nylon, polyethylene/polyacetal, or the like, or a combination thereof.

The sacrificial yarns can also include biodegradable materials. Suitable examples of biodegradable polymers are as polylactic-glycolic acid (PLGA), poly-caprolactone (PCL), copolymers of polylactic-glycolic acid and poly-caprolactone (PCL-PLGA copolymer), polyhydroxy-butyrate-valerate (PHBV), polyorthoester (POE), polyethylene oxide-butylene terephthalate (PEO-PBTP), poly-D,L-lactic acid-p-dioxanone-polyethylene glycol block copolymer (PLA-DX-PEG), or the like, or a combination thereof.

Water soluble polymers or ethanol soluble polymers are preferred for use in the sacrificial yarns. Suitable water-soluble polymers for use in the sacrificial yarns are polyvinyl alcohol, polyacrylamide, or a combination thereof. Polyvinyl butyral, which is soluble in alcohol may also be used.

The sacrificial yarn filaments may be present in the composite tow in an amount of greater than or equal to 15 volume percent, preferably greater than or equal to 30 volume percent and more preferably greater than or equal to 35 volume percent, based on the total volume of the composite tow prior to precursor infiltration.

Suitable ceramic filaments comprise silicon carbide (SiC), alumina (Al2O3), mullite ($Al_2O_3$—$SiO_2$), or a combination thereof. In an embodiment, the tow may contain non-ceramic fibers. Suitable non-ceramic fibers are carbon fibers. The ceramic matrix (that fills in the space between the fibers) comprises SiC, $Al_2O_3$, BN, $B_4C$, $Si_3N_4$, $MoSi_2$, $SiO_2$, SiOC, SiNC, and/or SiONC.

In one method of manufacturing a ceramic matrix composite (that initially comprises a sacrificial yarn), a plurality of ceramic filaments are spun into a composite tow along with filaments obtained from a sacrificial yarn.

In one method of manufacturing the composite tow, the sacrificial yarn filaments and ceramic filaments are co-mingled through a set of rollers. The sacrificial yarn filaments and ceramic filaments are passed through at least one set of rollers, resulting in a co-mingling of the two to manufacture the composite tow. The number and distribution of sacrificial yarn filaments and ceramic filament may be adjusted based on the desired composite tow.

The composite tow (containing the ceramic filament and the sacrificial yarn filament) is then subjected to a precursor infiltration process. The composite tow may be used in a preform if desired. In an embodiment, the preform may be a space filling insert (e.g., a noodle). The preform is placed in a precursor infiltration chamber where the temperature is raised over 500° C. to vaporize the ceramic precursor. During this temperature increase, the sacrificial yarn filaments undergo decomposition providing space in the composite tow for the ceramic vapors to diffuse and react. The ceramic precursor vapors are disposed in the spaces between the ceramic filaments thus filling in the spaces with a ceramic matrix. Other matrix infiltration processes such as melt infiltration or polymer infiltration pyrolysis (which are briefly detailed above) may also be used.

The tows containing the sacrificial yarn filaments thus contain at least 20 wt % of additional ceramic matrix compared with tows that do not contain the sacrificial yarn filaments prior to chemical vapor infiltration. In an embodiment, the tows containing the sacrificial yarn filaments thus contain at least 30 wt % of additional ceramic matrix compared with tows that do not contain the sacrificial yarn filaments initially. In yet another embodiment, the tows containing the sacrificial yarn filaments thus contain at least 40 wt % of additional ceramic matrix compared with tows that do not contain the sacrificial yarn filaments initially.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A composite tow comprising:
    a plurality of ceramic filaments; and
    one or more sacrificial yarn filaments co-mingled with the plurality of ceramic filaments; where the sacrificial yarn filaments are operative to undergo decomposition, dissolution or melting upon being subjected to an elevated temperature to leave only the plurality of ceramic filaments and open spaces between the plurality of ceramic filaments;
    where the ceramic filaments have an average filament diameter of 5 to 15 micrometers;
    wherein the sacrificial yarn filament is present in the composite tow in an amount of greater than or equal to 30 volume percent, based on a total volume of the composite tow.

2. The composite tow of claim 1, wherein the composite tow has an average diameter of 300 to 1500 micrometers.

3. The composite tow of claim 1, wherein the ceramic filaments comprise SiC, $Al_2O_3$, BN, $B_4C$, $Si_3N_4$, $MoSi_2$, $SiO_2$, SiOC, SiNC, and/or SiONC.

4. The composite tow of claim 1, wherein the sacrificial yarn filaments comprise metal fibers, ceramic fibers, polymeric fibers or a combination thereof.

5. The composite tow of claim 4, wherein the metal fibers and ceramic fibers melt at temperatures of less than 500° C.

6. The composite tow of claim 4, wherein the polymeric fibers comprise thermoplastic polymers, blend of thermoplastic polymers, thermosetting polymers, or blends of thermoplastic polymers with thermosetting polymers.

7. The composite tow of claim 1, wherein the sacrificial yarn filament comprises a water-soluble polymer, an ethanol soluble polymer, or a combination thereof.

8. The composite tow of claim 4, wherein the polymeric fibers comprise a water soluble polymer; and wherein the water-soluble polymer comprises polyvinyl alcohol, polyacrylamide, polyvinyl butyral, or a combination thereof.

9. The composite tow of claim 1, wherein the sacrificial yarn filaments are made of one selected from Indium, Cerrobend, Cerrelow 117, Cerrolow 174, Field's alloy, Harper's alloy, Lichtenberg's alloy, Lipowitz's alloy and Newton's alloy.

10. An article comprising the composite tow of claim 1.

11. A method comprising:
    co-mingling a plurality of ceramic filaments with one or more sacrificial yarn filaments to form a composite tow; where the ceramic filaments have an average filament diameter of 5 to 15 micrometers; wherein the sacrificial yarn filament is present in the composite tow in an amount of greater than or equal to 30 volume percent, based on a total volume of the composite tow;
    decomposing the one or more sacrificial yarn filaments to leave only the plurality of ceramic filaments and open spaces between the plurality of ceramic filaments; and
    infiltrating the open spaces with a ceramic precursor to form a tow that includes the ceramic precursor between the plurality of ceramic filaments.

12. The method of claim 11, where the composite tow has an average diameter of 300 to 1500 micrometers.

13. The method of claim 11, further comprising subjecting the composite tow to an elevated temperature effective to decompose the sacrificial yarn to produce open spaces between the plurality of ceramic filaments.

14. The method of claim 13, further comprising reacting the ceramic precursor to form a ceramic matrix.

15. The method of claim 14, wherein the ceramic matrix is SiC.

16. The method of claim 11, wherein the ceramic filament is SiC.

17. The method of claim 11, wherein the sacrificial yarn filament is present in the composite tow in an amount of greater than or equal to 35 volume percent, based on a total volume of the composite tow.

* * * * *